April 9, 1935.  H. NUTT  1,997,264
AUTOMATIC CLUTCH
Filed March 9, 1932  4 Sheets-Sheet 1
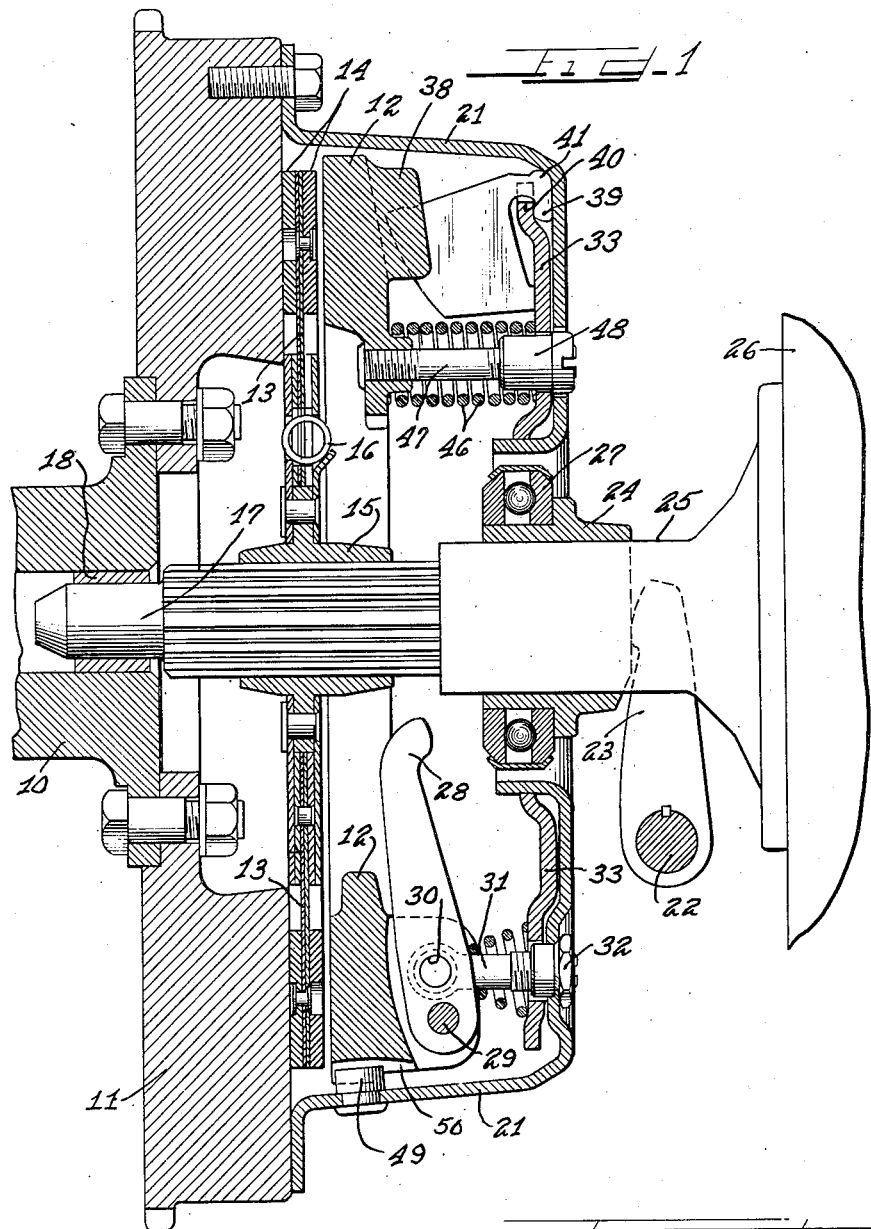
Inventor
Harold Nutt.
Charles Hills
By  Attys

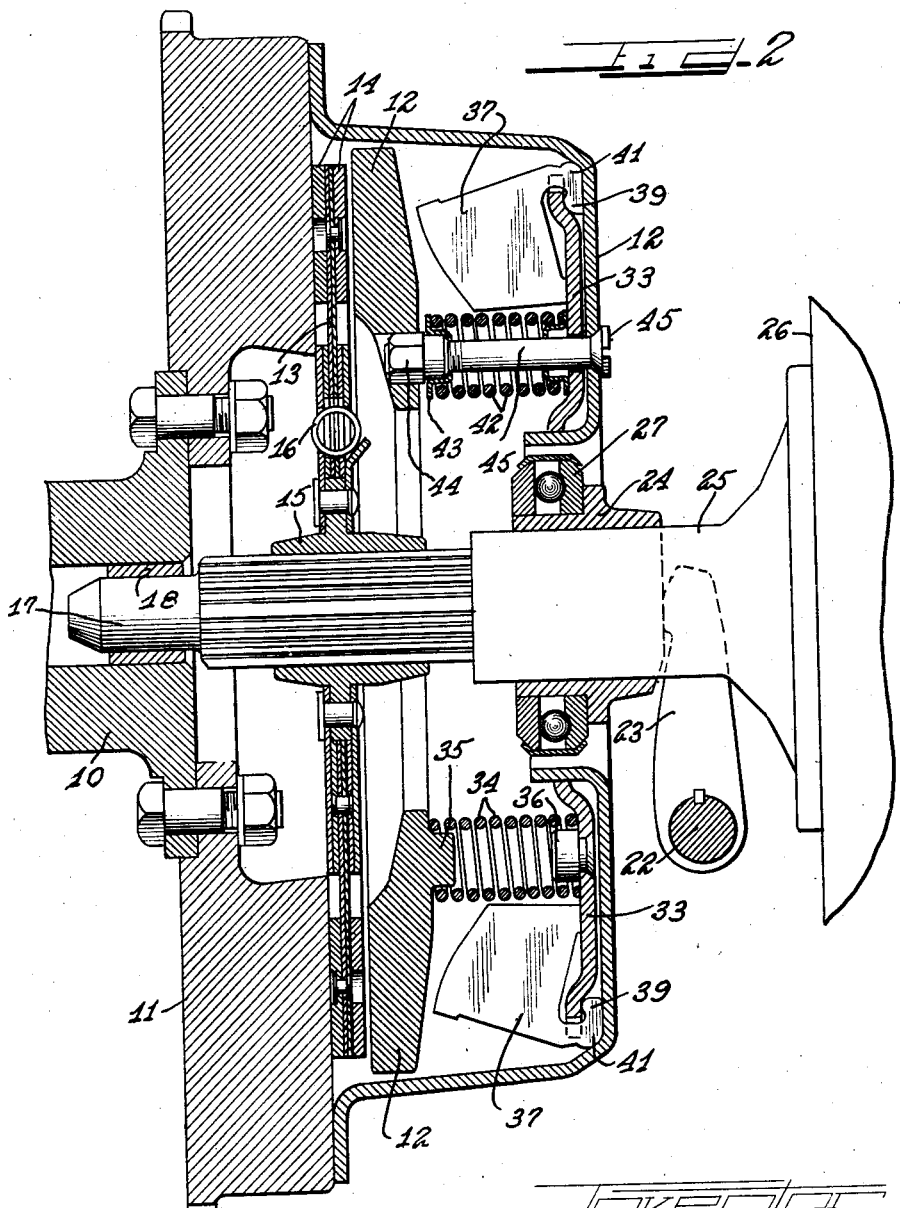

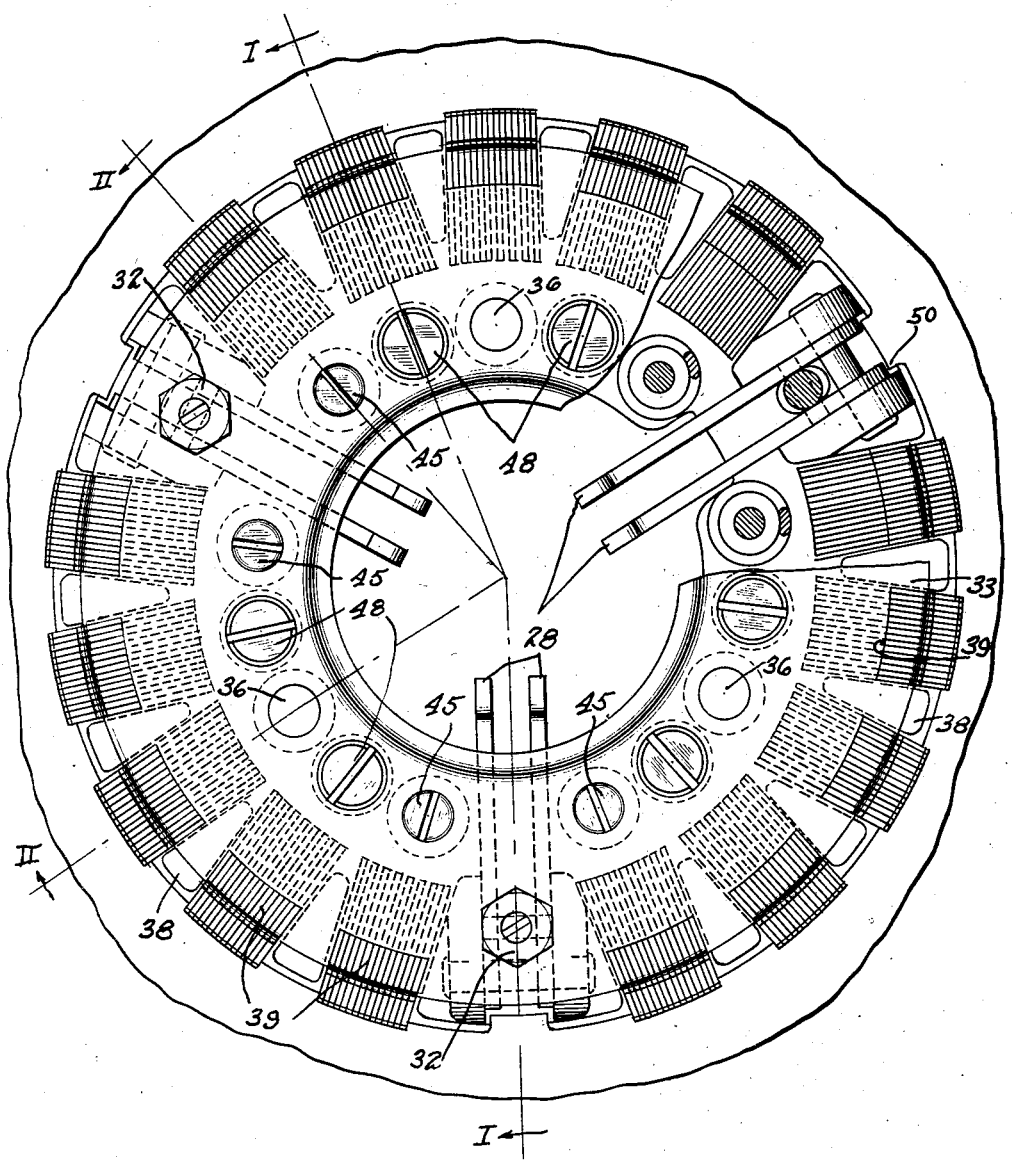

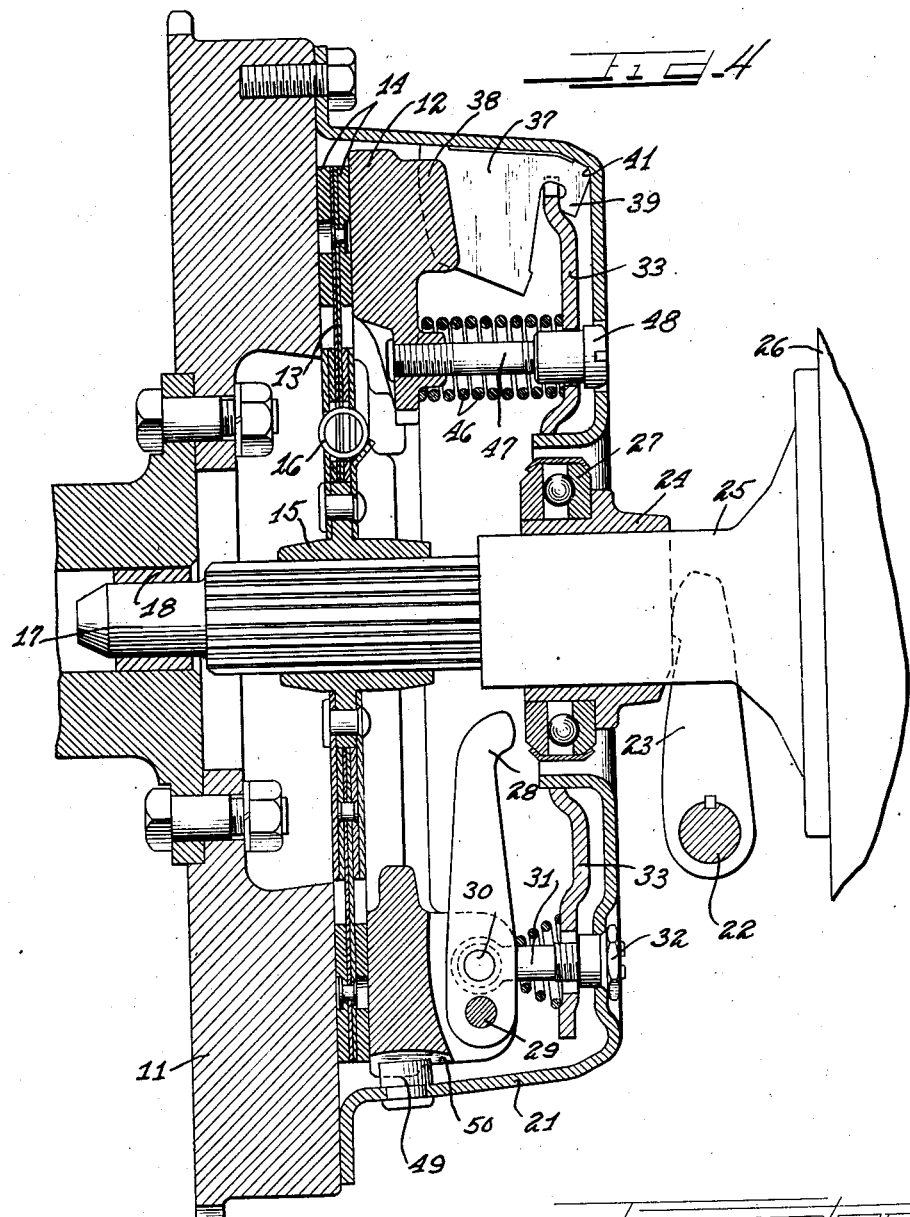

Patented Apr. 9, 1935

1,997,264

UNITED STATES PATENT OFFICE 1,997,264

AUTOMATIC CLUTCH

Harold Nutt, Chicago, Ill., assignor to The Borg & Beck Company, Chicago, Ill., a corporation of Illinois Application March 9, 1932, Serial No. 597,690

4 Claims. (Cl. 192—105)

This invention relates to automatically operating clutches of the centrifugal type wherein the clutch automatically engages at a predetermined rotative speed. While the chosen embodiment of the invention relates to automotive clutches, it will be understood that the clutch of my invention can be used for other purposes.

It is an object of this invention to provide an improved automatically operating clutch wherein centrifugal weights cause the clutch to engage when the driving member reaches a predetermined speed. Such centrifugally operated clutches have been proposed heretofore but have not been successful in automotive service, for example, because of the wide variation in rotative speeds above the necessarily low speed at which full initial engagement is required. If the centrifugally operative mechanism is made sufficiently sensitive to pick up and carry full load at the desired speed slightly above idling then the clutch action will be too harsh at higher speeds or for more rapid acceleration than usual. Also centrifugal force builds up rapidly at higher speeds, overloading the clutch operating mechanism. It is accordingly believed to be an important advantage of my invention that the clutch pressure is limited to a predetermined pressure fully attained at a relatively low speed and thereafter unaffected by further increases in the centrifugal force developed by the higher operating speeds. I accomplish this result by providing centrifugally responsive weights which act against a spring loaded ring and are limited in movement by a housing which takes any excess force developed by the weights. The spring loaded ring presses in turn on the normal clutch pressure plate so that the forces developed by the weights are transmitted to the pressure plate through springs, the pre-loading of which can be adjusted to obtain any desired maximum pressure on the pressure plate, which maximum pressure is obtainable at rotative speeds only slightly in excess of the relatively low initial engaging speed.

It is a further object of this invention to provide an improved clutch of the type described wherein a manual throwout mechanism is provided for retracting the pressure plate, this mechanism being required to only overcome the maximum spring pressure which approximates that of the same capacity clutch without the automatic feature. Thus the force required to manually disengage the clutch at even the highest rotative speeds is no greater than in a conventional clutch of equal capacity since the manual throwout mechanism is not required to retract the centrifugal weights.

It is also an important object of this invention to provide an automatic clutch actuated by centrifugal weights formed as groups of thin stampings radially disposed and held in position in the usual clutch housing by centrifugal force, the weights being pivoted in a corner of the housing and not in any way pinned or otherwise attached to the members against which they operate, the weights being aligned and grouped by peripheral notches in the member against which they operate, and guided by radial lugs on the clutch pressure plate. Thus the clutch design is rendered flexible since it readily permits an increase or decrease in the weights used and can therefore be readily adapted to a reasonably wide range of engine sizes by variation of the weights used and the pre-loading of the pressure springs against which the weights operate.

It is still another object of this invention to provide an improved and simplified automatic clutch that can be economically manufactured, and easily serviced to compensate for normal wear in use. Also, since the automatic clutch utilizes many features of a conventional manually operated clutch, an existing conventional clutch can be economically converted into the automatic clutch of this invention with the minimum labor and wastage of parts.

Other and further important objects of this invention will be apparent from the disclosures in the specification and the accompanying drawings.

This invention, in a preferred form, is illustrated in the drawings and hereinafter more fully described.

On the drawings:

Figure 1 is a vertical longitudinal section through an automotive type of clutch embodying the features of this invention, the section corresponding to the line I—I in Figure 3.

Figure 2 is a section similar to Figure 1 but taken on the line II—II of Figure 3.

Figure 3 is an end or rear view of the clutch mechanism with the housing and shaft omitted, partly broken at one place.

Figure 4 is a section corresponding to Figure 1 with the clutch elements engaged for driving, Figure 1 being the disengaged position.

As shown:

The automotive type of clutch chosen to illustrate one embodiment of this invention is of the single plate type although it is to be understood that my invention is not to be limited in application to the particular combination of conventional elements disclosed. As illustrated, an engine crankshaft 10 carries a flywheel 11, the rear face of which acts as one surface of the clutch driving member, an axially movable pressure plate 12 serving to press a clutch disc 13 against the flywheel 11. The clutch disc carries the usual facing material 14 on both sides and is yieldingly connected to its hub 15 by springs 16 which serve to avoid the transmission of torsional vibrations. A transmission drive shaft 17 which forms the driven shaft of the clutch is provided with splines on which the hub 15 slides and the shaft is journaled at its front end in a pilot bearing 18 axially located in the crankshaft. The pressure plate 12 and the operating mechanism therefor is enclosed in a casing or housing 21 bolted to the rear face of the flywheel.

The foregoing described structure is substantially the same as the well known Borg & Beck manually operated clutch wherein the pressure plate is urged against the clutch disc by spring pressure and is retracted by means of the usual clutch throwout lever acting on a shaft 22 having a fork 23 keyed thereto to shift a sliding collar 24 to the left on a sleeve 25 enveloping the clutch shaft 17 and secured to the transmission case 26. The collar 24 carries a thrust bearing 27 which contacts throwout fingers 28 pivoted at 29 to the pressure plate, and fulcrumed at 30 is an adjustable eye bolt 31 having a nut 32 seated in the housing. The adjusting nuts 32 are primarily provided to permit proper setting of the throwout fingers during manufacturing operations, but may be readjusted for wear in the clutch which might otherwise eventually require too great a travel of the clutch lever to secure full disengagement. Thus the clutch of this invention is manually operable in exactly the same way as the conventional clutch and has many parts in common therewith, so that a manual clutch of the type described can be altered to embody this invention by the substitution and addition of the automatically operating mechanism to be now described.

A spring mounting ring 33 is provided inside the right end of the housing and this ring forms a spring seat for three sets of springs disposed between the pressure plate and the spring ring. One set shown at the lower portion of Figure 2 comprises springs 34 disposed between bosses 35 and 36 carried by the pressure plate and the spring ring respectively. In the illustrated embodiment three of these springs are provided and may be conveniently called pressure plate springs since they are provided to advance the pressure plate when the spring ring is moved to the left by a plurality of centrifugal weights 37. These weights are conveniently formed as a plurality of thin stampings guided between bosses 38 on the pressure plate and having an extension lug 39 hooked over the back of the spring ring in notches 40 in the spring ring, and having the heel 41 of the lugs rounded and fulcrumed or bearing in the fillet at the corner of the housing the weights swinging outwardly about the heel 41 and thus causing the toe of the lugs 39 to move the spring ring to the left under the action of centrifugal force at a predetermined rotative speed above normal idling speed, the speed depending upon the preloading of a second set of six springs 42 which may be conveniently referred to as the retractor springs. These retractor springs seat on the spring ring at one end and the other end seats on a washer 43 which is supported by a nut 44 on a bolt 45 extending through the housing wall. Thus an adjustment of the nut relative to the bolt serves to adjust the spring tension, and for convenience the nut slides in, but is held from rotating by a suitably shaped aperture in the pressure plate, adjustments being made by screwing the bolt in or out.

It is to be noted that the retractor springs do not bear against the pressure plate, their sole function being to control the operation of the centrifugal weights and to move the spring ring to the right when the rotative speed drops below the predetermined speed at which the clutch engages.

A third group of six springs 46, shown in the upper part of Figure 1 are interposed between the pressure plate and the spring ring and are really the same as the first group of pressure springs 34 but have studs 47 disposed therein and secured to the pressure plate, the free end of the studs carrying a nut 48 which engages the back or right side of the spring ring. Thus there are nine pressure springs disposed in groups of three as shown in Figure 3, the outer springs of each group having the adjusting studs 47 therein. These studs are provided to secure parallelism of the pressure plate relative to the clutch disc and flywheel, and may also be utilized to control running clearances, while the nine pressure springs are so designed as to obtain an initial pre-loading to the desired total pressure. Thus if the centrifugal weights 37 and the studs 47 were omitted a fully operative manual release clutch would result as the nine pressure springs are loaded to the desired engaging pressure to carry the designed torque. With the addition of the centrifugal weights and studs the clutch becomes automatic in action although the pressure is limited to that of the equivalent manual clutch no matter how great the centrifugal force becomes at high rotative speeds since the weights swing out against the housing and transmit any excess forces directly thereto without further effect on the automatic operation or manual release of the clutch.

The clutch is so proportioned that engagement occurs in two stages, the first stage involving the movement of the pressure plate and spring mounting ring or spider to the left as a unit without further compressing the pressure springs. During this stage the clutch running clearances are taken up and an initial light engagement of the clutch accomplished due to a partial outward movement of the centrifugal weights against the resistance of the retractor springs. The partial clutch engagement so accomplished serves to smoothly pick up the load and a further increase of engine speed, after the clutch clearances have been so taken up, serves to further load the spring ring and pressure plate. In practice, there is sufficient load developed by the centrifugal action of the weights to carry full engine torque before the final movement of the weights takes place compressing the pressure plate springs. This provides an excess clutch capacity above engine torque, the amount being determined by the total thrust spring load used compared with the plate load actually required.

It should be noted that all the clutch elements with the exception of the clutch disc and throwout bearing revolve with the flywheel, and in order to relieve the connecting studs between the pressure plate and the housing or spring ring from torsional strains incident to clutch engagement, it is desirable to provide guide keys or buttons 49 in the housing which engage in guide slots 50 in the periphery of the pressure plate.

While the illustrated clutch closely resembles a conventional type of manually controlled clutch, and may have the same characteristics of clutch pressure and throw-out mechanism, it differs therefrom in that it is automatically and smoothly engaged at a predetermined rotative speed by means of centrifugal force which swings the weights 37 outwardly from the position of Figure 1 to that of Figure 4, causing a movement of the spring ring to the left in the figures, towards the flywheel and clutch disc. The spring ring is normally held in the position of Figure 1 by the six retractor springs and the spring ring in turn normally holds the pressure plate in fixed relationship wherein the pressure springs are compressed to a desired initial pre-loading by means of the studs 47 and nuts 48.

At a predetermined speed, adjusted by the retractor spring bolts, the tendency of the weights to swing outwardly into the position of Figure 4 overcomes the load of the retractor springs and moves the spring ring and pressure plate assembly to the left as a unit until the clutch disc, backed by the flywheel opposed further motion of the pressure plate. Thereafter, further outward movements of the weights in response to increased speed can still further advance the spring ring to the left, but since the pressure plate is engaged with and at least partially driving the clutch disc, the spring ring moves up on the studs 47 clearing the nuts 48 and thus bringing the full pre-loading pressure of the nine pressure springs into action to press the pressure ring against the clutch disc. Beyond the point where the weights swing out against the housing as in Figure 4, no further increase in clutch pressure will occur as the result of increased rotative speeds and centrifugal force, so that the total plate pressure is fully and exactly determined by the initial pre-loading of the pressure springs and is chosen to suit the engine characteristics and torque just as in the corresponding fully manually operated clutch; consequently the maximum capacity of the clutch can be accurately predetermined since it is unaffected by variations in the centrifugal force beyond that force required to secure full engagement. A corollary of this important advantage is that the manual throwout mechanism merely has to overcome the total spring pressure exactly as in the common form of conventional clutches. It is of course desirable that the centrifugal weights be capable of developing full clutch engagement at moderate engine speeds so that the slip range of the clutch will not be too extended but this problem offers no difficulty in the present design because there is more than ample provision for weight space at the periphery of the clutch where the weights are also most effective.

From the foregoing description it will be evident that the clutch can be thrown out by the usual foot operated mechanism at engine speeds above the point where the clutch engages automatically, and that the load on the pedal required for making this release need not exceed that in an equivalent conventional clutch of the same capacity since in both types the clutch throwout works against pressure springs the preloading of which determines the clutch capacity.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. An automatic clutch comprising a driving member, a driven member, a housing carried by the driving member and enveloping the driven member, a pressure plate within said housing and movable to engage the driven member against the driving member, a spring ring normally seated within and against the housing in spaced relationship to the pressure plate, preloaded pressure springs positioned between the spring ring and the pressure plate, retracting means for normally holding said spring ring and pressure plate in fixed relationship, with the pressure plate retracted from engagement with the driven member, centrifugal means for advancing the spring ring and thereby the pressure plate into engagement with the driven member, and manually operable means engageable with said pressure plate to retract the same at will.

2. An automatic clutch comprising a driving member, a driven member, a housing carried by the driving member and enveloping the driven member, a pressure plate within said housing and movable to engage the driven member against the driving member, a spring ring in spaced relationship to the pressure plate, preloaded pressure springs positioned between the spring ring and the pressure plate, retracting means for normally holding said spring ring and pressure plate in fixed relationship, with the pressure plate retracted from engagement with the driven member, centrifugal means positioned between the housing and the spring ring for advancing the spring ring and thereby the pressure plate into engagement with the driven member, and manually operable means engageable with said pressure plate to retract the same at will.

3. An automatic clutch comprising a driving member, a driven member, a housing carried by the driving member and enveloping the driven member, a pressure plate within said housing and movable to engage the driven member against the driving member, a spring ring normally seated within and against the housing in spaced relationship to the pressure plate, preloaded pressure springs positioned between the spring ring and the pressure plate, yieldable retracting means for normally holding said spring ring and pressure plate in fixed relationship, with the pressure plate retracted from engagement with the driven member, centrifugal means for advancing the spring ring and thereby the pressure plate into engagement with the driven member, said centrifugal means being arranged to compress said retracting means to transfer the preloaded pressure spring load to the pressure plate, and manually operable means engageable with said pressure plate to retract the same at will.

4. An automatic clutch comprising a driving member, a driven member, a housing carried by the driving member and enveloping the driven member, a pressure plate within said housing and movable to engage the driven member against the driving member, a spring ring in spaced relationship to the pressure plate, preloaded pressure springs positioned between the spring ring and the pressure plate, retracting means for normally holding said spring ring and pressure plate in fixed relationship with the pressure plate retracted from engagement with the driven member, centrifugal means positioned between the housing and the spring ring for advancing the spring ring and thereby the pressure plate into engagement with the driven member, said centrifugal means being arranged to compress said retracting means to transfer the preloaded pressure spring load to the pressure plate, and manually operable means engageable with said pressure plate to retract the same at will.

HAROLD NUTT.